Figure 1:
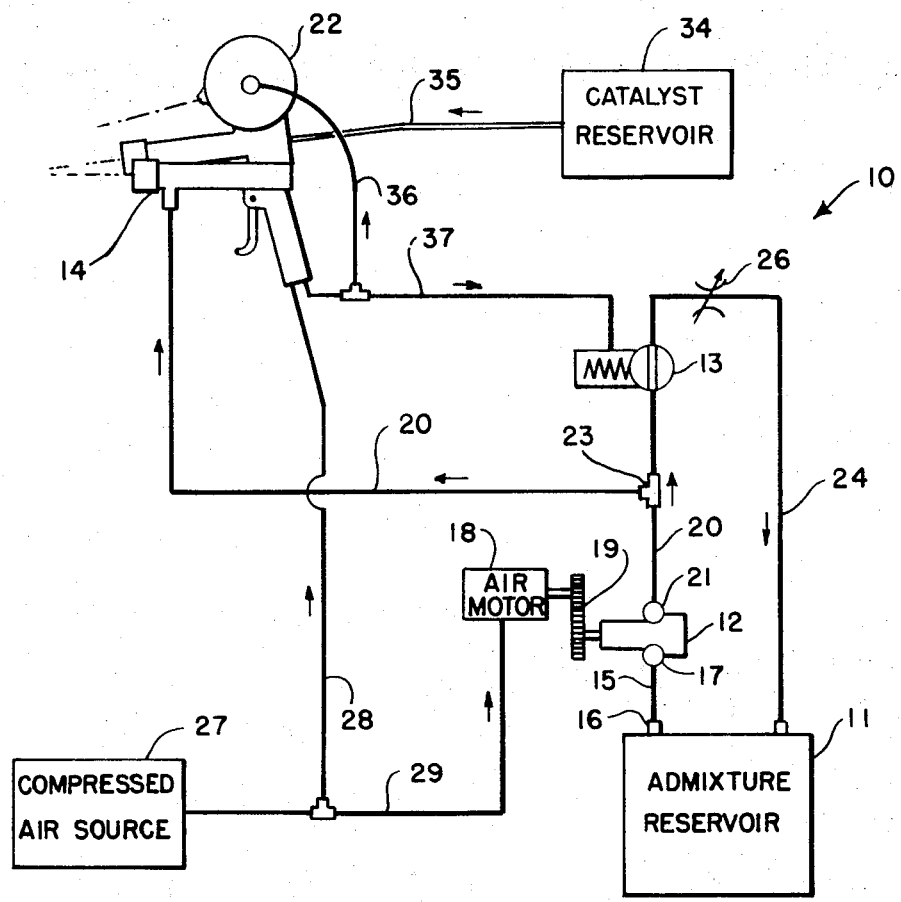

United States Patent [19]

Scharfenberger

[11] 3,780,942

[45] Dec. 25, 1973

[54] METHOD OF DISPENSING A MIXTURE OF RESIN AND EXPANDED THERMOPLASTIC SPHERES

[75] Inventor: James A. Scharfenberger, Indianapolis, Ind.

[73] Assignee: Ransburg Electro-Coating Corp., Indianapolis, Ind.

[22] Filed: Oct. 2, 1972

[21] Appl. No.: 293,809

Related U.S. Application Data

[62] Division of Ser. No. 88,579, Nov. 12, 1970, abandoned.

[52] U.S. Cl............... 239/1, 239/127, 117/104 B, 117/105.5
[51] Int. Cl............................................. B05b 17/04
[58] Field of Search.............................. 118/DIG. 2; 117/105.5, 104 B, 27, 16; 239/8, 11, 1, 127, 336

[56] References Cited
UNITED STATES PATENTS 2,991,015  7/1961  Standlick ............................. 239/127
3,399,834  9/1968  Bradley ............................. 239/336 X
3,484,262  12/1969  Hahn ..................................... 117/16

*Primary Examiner*—M. Henson Wood, Jr.
*Assistant Examiner*—John J. Love
*Attorney*—Merrill N. Johnson et al.

[57] ABSTRACT

A system for and a method of dispensing an admixture including a thermosetting or thermoplastic resin and expanded thermoplastic spheres. The system includes a reservoir for the admixture. A pump, which as a rotary pump, has its inlet connected to the reservoir and is adapted to withdraw the admixture from the reservoir. The length of time that the admixture is subjected to such pressure of the pump is insufficient to either cause harmful rupturing of the expanded spheres or to cause generation of heat of sufficient magnitude to cause harmful curing of the resin. A dispensing apparatus is connected to the outlet of the pump and is adapted to spray the admixture when activated. A valve may be connected between the outlet of the pump and the reservoir. The valve is adapted to terminate the flow of the admixture to the dispensing apparatus upon de-activation of the dispensing apparatus and to return the admixture withdrawn from the reservoir by the pump to the reservoir. The system may include a pressure balancing device to regulate the pressure of the system so that the system experiences little, if any, pressure differences when the system is cycled.

3 Claims, 2 Drawing Figures

METHOD OF DISPENSING A MIXTURE OF RESIN AND EXPANDED THERMOPLASTIC SPHERES

This is a division of Application Ser. No. 88,579, filed Nov. 12, 1970, now abandoned.

The present invention relates to a system for and a method of dispensing an admixture including a thermosetting or thermoplastic resin and up to 7 weight percent of expanded thermoplastic spheres and, more particularly, to a system for and method of spraying the admixture without causing harmful rupturing of the expanded spheres and without causing harmful curing of the resin during the period of time between withdrawing the admixture from a reservoir and spraying the admixture.

Difficulty has been experienced when dispensing or spraying an admixture including a thermosetting resin such as polyester resin and expanded thermoplastic spheres. Among other things, the expanded spheres are rather fragile in that an admixture containing the expanded spheres when subjected to an elevated pressure such as pressures in the order of 20 up to about 100 pounds per square inch or more for several minutes or more, may experience collapsing or rupturing of many of the spheres. The admixture may be subjected to such pressures when using air pressure to move the admixture from an outlet orifice of a pressure vessel. An admixture containing many collapsed or ruptured spheres is no longer suitable for providing molded products such as boat hulls, furniture parts, bathroom fixtures with good stiffness to weight properties.

Another difficulty associated with several prior attempts to spray the admixture including a thermosetting resin and expanded spheres is that with the expanded spheric content being from about one-half to about 7 weight percent of the total weight of the admixture, the admixture has a viscosity of such nature as to render the admixture difficult to move. Normally, the higher the viscosity of the admixture to be sprayed, the greater the pressure must be to satisfactorily move and spray the admixture. However, as disclosed above, if the admixture is subjected to high pressures for extended periods of time, the spheres tend to collapse or rupture and the like. I have found that an admixture containing expanded spheres may be subjected to pressures up to about 100 pounds per square inch or more for short periods of time such as in the range of seconds without experiencing harmful collapse or rupture of the expanded spheres.

A further difficulty associated with prior attempts to spray the admixture is that if during the withdrawal of admixture from the reservoir or during its movement through the system between the reservoir and the spray apparatus, the admixture is subjected to a shear force of high magnitude, that may generate heat sufficient to cause partial curing of the thermosetting resin prior to its emerging from the spray apparatus. Such partial curing of the thermosetting resin while in the system may be of such a degree as to cause clogging of the conduits used to provide a path of travel therefor while in the system.

Accordingly, it is an object of the present invention to provide a system and method that overcomes the above-mentioned problems. Another object of the invention is to provide a system and method whereby an admixture including a thermosetting resin and expanded thermoplastic spheres having a particle size up to about 200 microns can be pumped at commercially desirable rates to a dispensing apparatus using conventionally sized conduits between a reservoir for the admixture and the dispensing apparatus. A further object of the present invention is to provide a system and a method wherein the admixture is subjected to displacement pressure for a few seconds or less and the means for moving the admixture subjects the admixture to little shearing force.

Generally speaking, the present invention relates to a system for and to be a method of dispensing an admixture including a resin and expanded thermoplastic spheres. The system includes an admixture reservoir, a pump, a valve, a dispensing apparatus and sufficient conduit to inter-connect such means or components of the system. Preferably, the pump is a rotary pump of the positive displacement gear type that has its inlet connected to the reservoir and is adapted to withdraw the admixture from the reservoir while subjecting the withdrawn admixture to low shearing force. The forces used to withdraw the admixture from the reservoir and the length of time the admixture is subjected to such force is insufficient to either cause harmful rupturing of the expanded spheres or to cause generation of heat of sufficient magnitude to cause harmful curing of the resin. The dispensing apparatus is connected to the outlet of the pump and is adapted to spray the admixture when activated. The valve is a by-pass valve connected between the outlet of the pump and the reservoir. The by-pass valve is adapted to direct the flow of the admixture from the dispensing apparatus to the reservoir upon de-activation of the dispensing apparatus.

Figure 2:
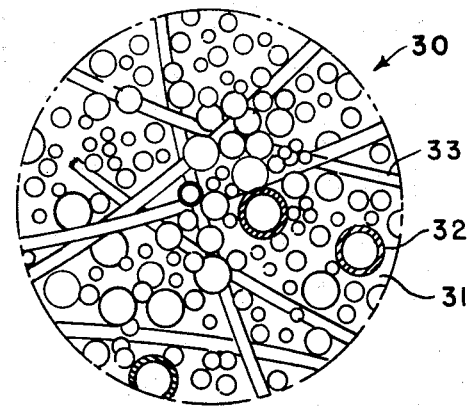

In the drawings:

FIG. 1 is a schematic showing the inter-connection of the several means of the present invention; and FIG. 2 is an enlarged side view of a sprayed composite material with one or more of the constituents thereof enlarged disproportionately with respect to the other constituents for clarity.

Referring now to FIG. 1, the system used to dispense an admixture including either a thermosetting or a thermoplastic resin and expanded thermoplastic spheres is generally indicated by reference numeral 10. The system 10 includes an admixture reservoir or admixture supply tank 11, a pump 12, a valve 13, a dispensing or spray apparatus 14, and a pressure balancing device 26.

The interior of the admixture reservoir 11 is at or near atmospheric pressure and at or near ambient temperature. The reservoir is fabricated from any suitable material such as a metal that is substantially chemically inert with respect to the admixture.

Preferably the resin constituent of the admixture is a thermosetting resin and, more preferably, a polyester resin or an epoxy resin. As between polyester resin and epoxy resin, the preferred resin is a polyester resin of the type usually used in spray-up or hand lay-up applications.

The expanded thermoplastic spheres include a shell of any suitable thermoplastic material such as vinylidene chloride-acrylonitrile copolymer or the like which has been expanded by the application of heat. Heat vaporizes a blowing agent such as isobutane or the like within the shell and softens the shell to permit the shell to expand and form a low density single cell sphere having a particle size up to about 200 microns. In the unexpanded state, the diameter of a sphere is typically about 4 to 20 microns and in the expanded state, the diameter of a sphere is typically 10 to 100 microns. It should be understood that the particle size of the expanded thermoplastic spheres may be as little as 10 microns and as great as 200 microns. However, the average size of the expanded thermoplastic spheres is in the range of about 30 microns. The thermoplastic sphere may be expanded using any one of several techniques. One suitable technique is to inject the unexpanded spheres into an environment containing heated water vapor such as steam at atmospheric pressure. Another technique of expanded the spheres is to entrain the spheres in water and then to heat the water to such a temperature, about 90°C to about 120°C at atmospheric pressure so as to cause the water to volitilize the blowing agent and expand the shells to provide expanded spheres having a particle size from about 10 microns up to about 200 microns.

The expanded thermoplastic spheres are placed in the reservoir and a sufficient amount of resin such as a suitable spray-up polyester resin is poured over the expanded spheres so as to provide an admixture containing about one-half to up to about 7 weight percent of expanded spheres. The expanded spheres and the resin are agitated in the reservoir 11 by a suitable agitator (not shown) such as a paddle immersed therein rotating at a speed of up to 30 revolutions per minute or more. The rotational speed of the agitator should be such as to insure proper mixing of the expanded spheres with the resin in a minimum amount of time yet not subject the expanded spheres to such a force as will cause harmful collapse or rupturing thereof.

The admixture including the expanded spheres and the resin may be stored in the reservoir 11 up to two days without the spheres or the resin undergoing a harmful chemical reaction which harmfully undermines the chemical or physical properties or either of these contituents of the admixture. Prolonged periods of storage may, however, result in degradation of the spheres to such an extent that they are no longer satisfactory for their intended purpose.

A pump 13, such as a rotating positive displacement gear type pump capable of moving admixtures having average viscosities of about 100,000 to 120,000 Universal Saybolt Seconds (SSU) is connected to the material reservoir 11 through a suitable conduit 15. The conduit 15 is used to connect the outlet port 16 of the reservoir 11 to the inlet port 17 of the pump 12. The conduit 15 may be fabricated from any suitable plastic or metallic material that is chemically inert with respect to the admixture being moved there through. For purposes of illustration and not for purposes of limitation, the conduit 15 may have an internal diameter of about 0.75 of an inch and a length of about six feet.

The pump 15 is driven by a suitable prime mover 18 such as an air motor coupled thereto through a suitable gear reduction means 19. The air motor 18 drives the pump at up to approximately 250 revolutions per minute. The air motor 18 may be an adjustable speed motor thereby permitting an operator to vary the flow rate of the admixture through the system 10. A suitable pump 18 is a Viking 724 pump. A positive displacement gear type pump is particularly advantageous for moving the admixture of expanded spheres and resin since the action of the pump does not cause harmful "squeezing" of the admixture of the type normally associated with a piston type pump or the excessive "paddling" and "shearing" effects normally associated with less efficient rotary type pumps. Excessive "squeezing", "paddling" and "shearing" of the admixture in the system may cause harmful collapse or fracture of the expanded spheres resulting in the substantial loss of the intended purpose of the expanded spheres in the admixture. Furthermore, the pressure exerted on the admixture by the pump must be such that little, if any, heat is evolved during movement of the admixture through the system 10. The premature application of heat to the admixture may cause harmful partial curing of the resin constituent of the admixture thereby resulting in clogging of the conduits used to transport the admixture and/or the production of an undesirable end product being fabricated.

A conduit 20 is connected to the outlet 21 of the pump 12 and to an admixture spray apparatus 14. The details of the construction of spray apparatus 14 will not be disclosed here since those structural details and the function of the apparatus are discussed in U.S. Pat. No. 3,399,834. The spray apparatus 14 may include a means 22 for introducing chopped glass roving into the spray of admixture emerging from the spray apparatus. The conduit 20 may be fabricated from any suitable plastic or metallic material which is chemically inert with respect to the admixture including a resin and expanded thermoplastic spheres. For purposes of illustration and not for purposes of limitation the conduit 20 may have a length of about 25 feet and an internal diameter of about 0.5 of an inch.

Valve 13 is connected to the outlet 21 of pump 12 through T-coupling 23. The valve 13 is a by-pass valve that is activated to an open position from a normally closed position when the spray apparatus 14 is in a non-spray or de-activated position. In the open position, valve 13 allows admixture from the reservoir 11 being pumped by pump 12 to be returned to the reservoir for subsequent use before system pressure can harmfully collapse or rupture the spheres. The advantages of incorporating the valve 13 include the realization of spraying the admixture at a pressure-flow rate common to the spray-up industry; subjecting the admixture to an elevated pressure for a few seconds whether spraying the admixture or returning the admixture to the reservoir 11 via the valve 13; and subjecting the admixture to a reduced shearing action in the pump 12 which the pump is operating.

The system 10 may include a suitable pressure balancing system to suitably regulate the internal pressure of the system so that the system experiences little, if any, lag upon activation of spray apparatus 14.

The system 10 may include a suitable pressure balancing device 26 which suitably regulates the internal pressure of the system so that the system experiences little, if any, pressure variation whether the admixture is flowing from the spray apparatus 14 or the by-pass valve 13. Thus, little, if any, lag in dispensing the admixture is experienced when the system is cycled. The device 26 may be connected in conduit 24 in series with the by-pass valve 13 and reservoir 11. Device 26 may be a variable fluid restrictor such as an adjustable needle valve, a fluid operated diaphram valve and the like.

A source of compressed air 27 is suitably connected to air motor 18 and to spray apparatus 14 by conduits 28 and 29 respectively. Depressing the trigger of the spray apparatus 14 causes compressed air from the source 27 to be supplied to the glass roving chopper 22 and to the valve 13 through conduits 36 and 37 respectively. The fluid or air signal supplied to the valve 13 biases such valve from an "open" to a "closed" position. A suitable catalyst from catalyst reservoir 34 is supplied to the apparatus 14 via conduit 35 upon depression of the trigger of the spray apparatus.

Having thus discussed the several components of the system, the operation of those components will now be described by way of example. The Example is given for illustration only and not for the purpose of limitation.

EXAMPLE

A cylindrical reservoir 11 having an inside diameter of about 12 inches and a height of about 15 inches is approximately half filled with expanded thermoplastic spheres that have an average particle size of about 30 microns. A cobalt promoted hand lay-up or spray-up polyester resin, known as No. 33-064 or 33-072 manufactured by Reichold Chemical, Inc. is poured over the expanded thermoplastic spheres until such time as the expanded spheres constitute approximately three to five weight percent of the total weight of the constituents contained within reservoir 11. The polyester resin and the expanded spheres are mixed for about 10 to 20 minutes with a Cowles dispenser blade rotating at about 2000 to 3000 revolutions per minute. Preferably, the temperature of the mix during mixing cycle does not rise above about 50°C. The constituents are prevented from separating to any significant degree by agitating with a paddle-type agitator rotated at a speed of about 30 to 100 revolutions per minute. The reservoir may be suitably covered. The admixture within the reservoir is at atmospheric pressure and at a temperature of about 23°C. The viscosity of the admixture in the reservoir is between about 100,000 and 120,000 SSU. The pump 12 is activated and withdraws the admixture of expanded spheres and polyester resin from the reservoir at a rate of about one-half to one gallon or more of admixture per minute. The pressure at the outlet port of the pump is about 100 pounds per square inch. The spray apparatus is activated and a pair of outboard, converging sprays of the admixture is provided about four to six inches in front of the spray apparatus. A center spray of a suitable peroxide catalyst such as methyl-ethyl ketone peroxide is introduced into the converging outboards sprays of the admixture at about the locus of points produced at the intersection of the outboard sprays thereby providing an intermixed spray of admixture and peroxide catalyst. The intermixed spray impinges on a suitable mold surface (not shown) at such a forward velocity as to minimize any tendency of the expanded spheres to collapse or rupture. A glass roving chopping device 22 positioned immediately above and carried by the spray apparatus 14 may be used to introduce suitable lengths of glass roving into the intermixed spray of admixture and peroxide catalyst. The roving is used primarily to strengthen the resultant composite material, provided on the mold (not shown). De-activating the spray device 14 causes the valve 13 to be activated so that it is now in an "open" position. The pump 12 continues to withdraw admixture from the reservoir 11; however, the admixture is now returned to the reservoir through the opened valve 13 and the conduit 24. Activating the spray device 14 causes the valve 13 to be de-activated and hence "closed". The admixture now flows from the reservoir to the spray apparatus when it is dispensed as a spray.

A composite 30 which may be provided by the system 10 is illustrated in FIG. 2. The composite 30 as illustrated is not drawn to scale but rather some constituents thereof are enlarged with respect to other constituents in order to more clearly show several aspects thereof. The composite 30 includes a matrix 31 of a suitable resin such as a promoted spray-up polyester resin known as 33-064 manufactured by Reichhold Chemical, Inc., expanded thermoplastic spheres 32 having an average diameter of about 30 microns and lengths of glass roving 33 having an average length of about ½ to 1 ½ inches or more dispersed throughout the matrix in a jack-straw fashion. Of the total weight of the polyester resin and expanded spheres, the expanded spheres comprise about three to five weight percent. Of the total weight of the composite 30, the chopped roving constitutes about 20 to 35 weight percent. The remainder of the composite is composed of polyester resin. The density of the resultant composite including the expanded spheres is considerably less than the density of a composite without the expanded spheres. The density of the composite shown in FIG. 2 is such that the composite will float at the surface of the water whereas a composite without the spheres will not float at the surface of the water. Further, the spraying of an admixture including expanded spheres appears to reduce the roll-out required by composites consisting of polyester resin and chopped roving by reducing air bubbles and the tendency of the ends of the chopped roving to project from the surface of the composite.

The use of expanded thermoplastic spheres with thermosetting resin is useful in fabricating furniture parts, wall panels, bathroom fixtures, modular units, boat hulls and the like because of factors such as reduced weight, increased buoyancy, stiffness and good impact resistance.

While the invention is illustrated and described in an embodiment, it will be understood that modifications and variations may be effected without departing from the scope of the concepts of this invention.

I claim:

1. A method for dispensing an admixture including a resin and expanded spheres having a particle size of up to about 200 microns, the method including the steps of providing a reservoir with the admixture including the resin and the expanded spheres,
withdrawing the admixture from the reservoir at a pressure sufficient to displace the admixture from the reservoir, the admixture withdrawn from the reservoir being subjected to the withdrawal and movement pressure for a period of time insufficient to cause harmful rupturing of expanded spheres and insufficient to generate the amount of heat necessary to cause harmful curing of the resin, prior to being sprayed, and
dispensing the admixture from a dispensing apparatus as converging streams that intersect prior to impinging upon a deposition surface.

2. The method of claim 1 including the further step of terminating the flow of the admixture to the dispensing apparatus upon de-activation of the dispensing apparatus and returning the admixture withdrawn from the reservoir to the reservoir.

3. A composite material of thermosetting resin and expanded thermoplastic spheres fabricated using the method of claim 1.

* * * * *